Figure 4:
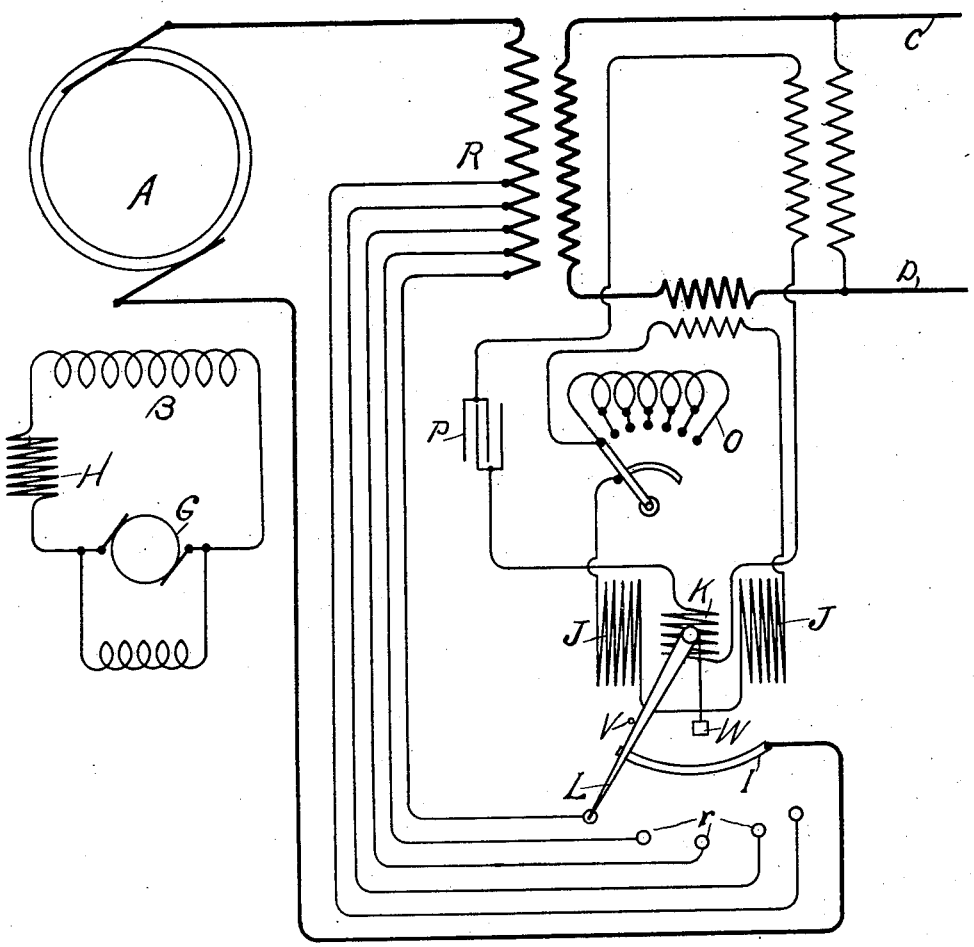

No. 738,799. PATENTED SEPT. 15, 1903.
L. A. HAWKINS.
ALTERNATING CURRENT COMPENSATING SYSTEM.
APPLICATION FILED FEB. 10, 1903.
NO MODEL. 2 SHEETS—SHEET 1.
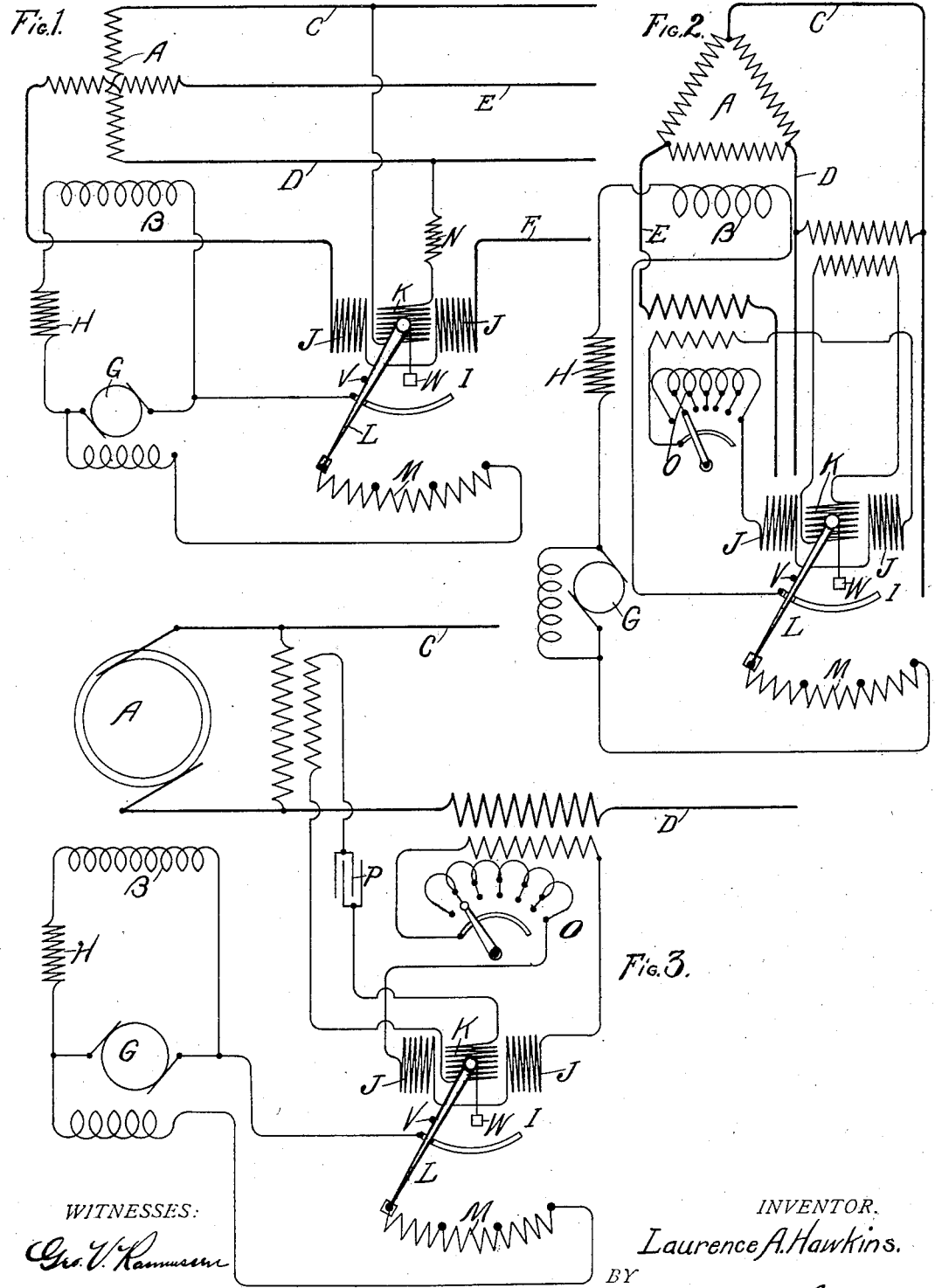
WITNESSES: INVENTOR.
Laurence A. Hawkins.
BY
his ATTORNEYS.

No. 738,799. Patented September 15, 1903.

UNITED STATES PATENT OFFICE.

LAURENCE A. HAWKINS, OF PITTSFIELD, MASSACHUSETTS, ASSIGNOR TO STANLEY ELECTRIC MANUFACTURING COMPANY, OF PITTSFIELD, MASSACHUSETTS, A CORPORATION OF NEW JERSEY.

ALTERNATING-CURRENT-COMPENSATING SYSTEM.

SPECIFICATION forming part of Letters Patent No. 738,799, dated September 15, 1903.

Application filed February 10, 1903. Serial No. 142,783. (No model.)

*To all whom it may concern:*

Be it known that I, LAURENCE A. HAWKINS, a citizen of the United States, and a resident of Pittsfield, Massachusetts, have invented certain new and useful Improvements in Alternating-Current-Compensating Systems, of which the following is a specification.

The object of my invention is to provide means for compensating for the varying drop in voltage on alternating-current-transmission lines due to varying loads and varying power factors and for the drop in voltage in alternating-current generators due to lagging currents of varying power factors.

It is well known that the varying power factors of lagging currents in alternating-current systems produce great variations of voltage by their demagnetizing effect on the generator and by the increased resistance-drop on the line for a given amount of power because of the low-power factor, and hence the regulation of the system is seriously impaired. In my present invention I remedy these evils by providing means for automatically raising the voltage to compensate for drop due to varying currents and varying lag.

Referring to the drawings, Figure 1 is a diagrammatic representation of a two-phase system embodying my invention. Fig. 2 shows a three-phase system embodying my invention. Fig. 3 shows a modification of my invention applied to a single-phase system, and Fig. 4 shows a further modification.

Referring now to Fig. 1, A represents a two-phase generator. B is the generator-field. C D E F are the line-wires, C D belonging to one phase and E F to the other. G is an exciter for the generator-field, and H is a hand-rheostat in the generator field-circuit. I is the compensator. It consists of the stationary coils J J in series with one phase and the movable coil K in shunt to the other phase of the generator. Coil K carries an arm L, which as coil K revolves moves over the contacts of the variable rheostat M, which is connected in the field-circuit of exciter G. L is held normally against the stop V by weight W or by any equivalent device, such as a spring. N is a non-inductive resistance in series with movable coil K.

The operation is as follows: If the current in phase E F is in phase with its voltage, the current in coils J J will be ninety degree out of phase with the current in coil K, since the voltage in phase C D is ninety degree out of phase with the voltage in phase E F. There will then be no tendency for coil K to turn. If now the current in E F lags, the ninety-degree relation between the currents in coils J J and coil K will be disturbed and there will be a turning tendency in coil K, which will be proportional to the amount of current in E F and to its lag. As K turns, arm L cuts out resistance from the exciter field-circuit, thus raising the exciter voltage, and consequently the generator voltage. If the current in E F increases in volume or lag, coil K will turn still farther and raise the generator voltage still more.

It will be understood that it is not necessary that arm L itself should contact with the steps of rheostat M, as in some cases it may be preferable that the movement of arm L should merely work a relay, which in turn should move a contact over the steps of the rheostat.

In order to permit of compensation for voltage-drop on non-inductive load, I provide the additional feature shown in Fig. 2, together with certain modifications. In this figure I have shown a three-phase generator, though it will be understood that the modifications shown are equally applicable to the two-phase generator of Fig. 1. In Fig. 2 the current for coils J J and coil K is obtained through a series and a shunt transformer, respectively, instead of directly, as in Fig. 1, and rheostat M is shown connected in the generator field-circuit instead of that of the exciter. The addition that permits of compensating for non-inductive loads is indicated at O.

O is an adjustable choke-coil or similar phase-shifting device in series with coils J J. The impedance of coil O is so adjusted that when the current in E is in phase with its voltage the current in coils J J lags behind the current in coil K a little more than ninety degrees. Under these conditions there will be some tendency for coil K to turn even on non-inductive load, and as this tendency is proportional to the current volume in E the voltage-drop due to line resistance will be compensated for. If now the current in E lags, the current in J J will lag still farther behind the current in K, the turning tendency of K will be increased, more resistance at M will be cut out, and the lag will be compensated for. Thus the voltage-drop for all lagging or non-inductive loads will be automatically compensated.

In the above applications of my invention I have made use of the phase difference produced by a multiphase generator; but my invention is equally applicable to a single-phase system. Such a system is shown in Fig. 3. Here, in addition to variable choke-coil O in circuit with coils J J, I insert a condenser P in circuit with coil K. By this means I am enabled to obtain the same phase difference between J J and K as heretofore obtained from the multiphase systems. The other details are the same as heretofore described and need no further explanation.

The application of my invention is not limited to the generating end of the line. It may also be applied at the receiving end to maintain the excitation of a synchronous motor or rotary converter at a proper value to compensate for lagging current in the mains. Neither is the application of my invention limited to affecting the field-current and the voltage of the generator. It may also be applied to cutting in or out turns in a regulating-transformer or similar apparatus. Fig. 4 shows one such arrangement. R represents a step-up transformer having regulating-taps on its low-tension winding connected to contacts $r$ $r$, which are adapted to be engaged by arm L. Arm L thus cuts out or in the regulating turns of the transformer R, and thus raises or lowers the voltage on the mains.

I do not desire to limit myself to the particular construction and arrangement of parts shown, since modifications therein which do not depart from the spirit of my invention will be obvious to those skilled in the art.

I claim as new and desire to secure by these Letters Patent—

1. In a compensator for alternating-current systems, a stationary coil in a circuit in which the current varies in strength and phase with the current in the main circuit, a movable coil in a circuit in which the current bears a fixed phase relation to the potential of the main circuit, and means actuated by the movement of the movable coil for affecting the voltage in the main circuit.

2. In a compensator for alternating-current systems, a stationary coil in a circuit in which the current varies in strength and phase with the current in the main circuit, a movable coil in a circuit in which the current bears a fixed phase relation to the potential of the main circuit, means for maintaining a predetermined phase difference between the currents in the fixed and movable coils when the current in the main circuit is in phase with its voltage, and means actuated by the movement of the movable coil for affecting the voltage in the main circuit.

3. In an alternating-current system, the mains, a series transformer having its primary connected in one of the mains, a potential-transformer connected in shunt to the mains, a fixed coil connected to the secondary of the series transformer, a movable coil connected to the secondary of the potential-transformer, and means actuated by the movement of the movable coil for affecting the voltage of the mains.

4. In an alternating-current system, the mains, a series transformer having its primary connected in one of the mains, a potential-transformer connected in shunt to the mains, a fixed coil connected to the secondary of the series transformer, a movable coil connected to the secondary of the potential-transformer, a phase-shifting device for maintaining a predetermined phase difference between the currents in the fixed and movable coils when the current in the mains is in phase with the voltage on the mains, and means actuated by the movement of the movable coil for affecting the voltage of the mains.

5. In a compensator for alternating-current systems, a coil in a circuit in which the current varies in strength and phase with the current in the main circuit, a second coil in a circuit in which the current bears a fixed phase relation to the potential of the main circuit, one of said coils being movable, and means actuated by the movable coil for affecting the voltage in the main circuit.

6. In an alternating-current system, two coils, one of them being movable, in circuits in which the currents differ in phase by an amount varying with the lag in the main circuit, and means actuated by the movement of the movable coil for affecting the voltage of the main circuit.

7. In an alternating-current system, two coils, one of them being movable, in circuits in which the currents differ in phase by an amount varying with the lag in the main circuit, means for maintaining a predetermined phase difference between the currents in said circuits when the lag in the main circuit is zero, and means actuated by the movement of the movable coil for affecting the voltage of the main circuit.

Signed at Pittsfield, Massachusetts, this 3d day of February, 1903.

LAURENCE A. HAWKINS.

Witnesses:
RICHARD EYRE,
R. E. HAYNES.